(12) United States Patent
Badar et al.

(10) Patent No.: US 9,483,596 B1
(45) Date of Patent: Nov. 1, 2016

(54) MULTI POWER SYNTHESIS IN DIGITAL CIRCUIT DESIGN

(71) Applicant: International Business Machines Corporation, Armonk, NY (US)

(72) Inventors: John T. Badar, Austin, TX (US); David J. Geiger, Poughkeepsie, NY (US); KM Mozammel Hossain, Austin, TX (US); Paul G. Villarrubia, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/991,568

(22) Filed: Jan. 8, 2016

(51) Int. Cl.
G06F 17/50 (2006.01)

(52) U.S. Cl.
CPC .................. *G06F 17/505* (2013.01)

(58) Field of Classification Search
CPC .......................... G06F 17/5045; G06F 17/505
USPC ........................................ 716/101, 103, 104
See application file for complete search history.

(56) References Cited

U.S. PATENT DOCUMENTS

| | | | |
|---|---|---|---|
| 6,608,638 B1 * | 8/2003 | Kodosky | G06F 11/2294 703/22 |
| 6,833,747 B2 | 12/2004 | Correale, Jr. | |
| 7,305,639 B2 | 12/2007 | Floyd et al. | |
| 7,456,654 B1 | 11/2008 | Rau et al. | |
| 7,554,378 B2 | 6/2009 | Walker | |
| 7,884,599 B2 | 2/2011 | Habib et al. | |
| 8,086,980 B2 | 12/2011 | Vogel | |
| 8,269,540 B2 | 9/2012 | Cook | |
| 8,502,559 B2 | 8/2013 | Narwal | |
| 8,751,982 B2 | 6/2014 | Ficke et al. | |
| 8,884,652 B2 | 11/2014 | Qi | |
| 2013/0021084 A1 | 1/2013 | Sreenivasaiah | |
| 2015/0109036 A1 | 4/2015 | Gomm et al. | |

OTHER PUBLICATIONS

Ali et al.; "An Efficient FPGA Based HDB3 Decoding System Using Direct Digital Synthesis", International Journal of Future Computer and Communication, vol. 2, No. 6, Dec. 2013, pp. 576-580.
Hosseini et al.; "Modified Structures for Power-Efficient Level Translators", Electrical Engineering (ICEE), 2013 IEEE 21st Iranian Conference On, May 14-16, 2013, pp. 1-4.
ip.com et al.; "Enhanced Level Translator for Digital Signals Between Logic Clusters That are Powered by Slightly Different Voltages", IPCOM000228830D, Jul. 9, 2013, pp. 1-5.

* cited by examiner

*Primary Examiner* — Sun Lin
(74) *Attorney, Agent, or Firm* — Cantor Colburn LLP; Margaret McNamara

(57) ABSTRACT

A method, system and computer program product for forming a netlist for an electronic circuit is disclosed. A Very High Speed Integrated Circuit Hardware Description Language (VHDL) file is created for a plurality of voltage domains. The VHDL file includes a voltage domain attribute and a logic voltage attribute for a pin of the electronic circuit. The voltage domain attribute and the logic voltage attribute for the pin are read from the VHDL file. Netlist instructions for the pin are synthesized to form a netlist for the electronic circuit. Synthesizing the netlist instructions begins with synthesizing netlist instructions within a voltage domain indicated by the voltage domain attribute and ends with synthesizing netlist instructions within a voltage domain indicated by the logic voltage attribute.

20 Claims, 6 Drawing Sheets

```
1:  Start find_multi_power_domain
2:    Define primary power supply = vdd                          ## This code is called during synthesis
3:    Define secondary power supply = vio                        ## Macro power supply
4:    Primary Input =PI                                          ## embedded IP/Level Translator (LT)/logic gate with vio supply
5:    Primary Output =PO                                         ## Primary input to the macro
6:    if pre placement file exist {                              ## Primary output to the macro
7:       pre-place all instances during synthesis as requested by the user    ## optional
8:    }
9:    read macro vhdl {
10:      get power supply names: vhdl has attribute pin_power_domain          ## should have both vdd and vio
                                                                              ## as power supply
11:      read all macro pins and get attributes                                ## collect power attributes for synthesis
12:      read all embedded IP pins and get attributes                          ## includes level translators and embedded IP
13:   }
14:   if PI attribute = vdd {
15:      all downstream logic connected to PI inherit vdd as power supply      ## Input on primary power supply, vdd
16:      if PI or logic connects to embedded IP {
17:         check PI attribute with embedded IP's PIN attribute                ## IP=arrays or Level Translator (LT)
18:         if both attributes matches {hide secondary power vio}
19:         else {
20:            severe errors and exit from synthesis
21:            check logic for power connectivity                              ## formal verification tool
22:         }                                                                  ## checks power connectivity
23:         proceed with normal synthesis flow                                 ## Synthesis will use power attribute
24:      }                                                                     ## to correctly place logic gates in VDD region
25:   }
26:   else
27:      all downstream logic connected to PI inherit vio as power supply      ## Input on secondary power supply, vio
```

FIG. 4

```
28:  If PI or logic connects to embedded IP {
29:      check PI attribute with embedded IP's PIN attribute         ## IP=arrays or Level Translator(LT)
30:      if both attributes matches {hide primary power supply vdd}
31:      else {
32:          severe errors and exit from synthesis
33:          check logic for proper power connectivity
34:      }
35:  }
36:  proceed with normal synthesis flow}
37:
38:  if PO attribute = vdd {
39:      check driving logic or IP's PO attributes                   ## Synthesis will use power attribute to
40:      if both attributes matches {hide secondary power vio}       ## correctly place logic gates in VIO region
41:      else {
42:          Severe errors and exit from synthesis                   ## Output on primary power supply, vdd
43:          Check logic for proper power connectivity
44:      }
45:      proceed with normal synthesis flow
46:  }
47:  else {
48:      check driving logic or IP's PO attributes
49:      If both attributes matches {hide primary power supply vdd}
50:      else {
51:          severe errors and exit from synthesis
52:          check logic for proper power connectivity
53:      }
54:      proceed with normal synthesis flow                          ## Primary Output with vio supply
55:  } END
```

FIG. 4
CONTINUED

MULTI POWER SYNTHESIS IN DIGITAL CIRCUIT DESIGN

BACKGROUND

The present invention relates to manufacture of electronic devices having different voltage domains, and more specifically, to a method of synthesizing a macro of an electronic device having different voltage domains to form the electronic device as a single unit during a manufacturing step.

Various electronic devices are designed with components that operate in different voltage domains. Components that operate at one voltage level are often assembled within one voltage domain while components that operate at another voltage level are assembled within another voltage domain. Level translators are then formed to bridge a signal such as a digital signal across the different voltage domains, thereby allowing components of one voltage domain to communicate with components in the other voltage domain without signal loss. Manufacture of the electronic device generally includes manufacturing the voltage domains as one set of steps and forming the level translators at appropriate location at a separate step during later manufacturing stage.

SUMMARY

Embodiments include a method, system and computer program product for forming a netlist for an electronic circuit. The method includes: creating a Very High Speed Integrated Circuit Hardware Description Language (VHDL) file for a plurality of voltage domains, wherein the VHDL file includes a voltage domain attribute and a logic voltage attribute for a pin of the electronic circuit; reading the voltage domain attribute and the logic voltage attribute for the pin from the VHDL file; and synthesizing netlist instructions for the pin beginning with synthesizing netlist instructions within a voltage domain indicated by the voltage domain attribute and ending with synthesizing netlist instructions within a voltage domain indicated by the logic voltage attribute to form the netlist for the electronic circuit.

BRIEF DESCRIPTION OF THE DRAWINGS

FIG. 4 shows a pseudocode algorithm for manufacturing a netlist for a macro in one embodiment of the present invention.

DETAILED DESCRIPTION

Embodiments of the present invention include a method, system and computer program product for forming a netlist file for designing and manufacturing an electronic device with multiple voltage domains as a single electronic component. In one embodiment, a Very High Speed Integrated Circuit Hardware Description Language (VHDL) file is read that contains a schematic logic for a macro of the circuit. The VHDL file includes pin attributes for boundary pins of the voltage domains. The pin attributes can include an attribute for the voltage domain of the pin and an attribute for the logic voltage for the pin. A synthesis step forms the netlist file that includes netlist instructions for a level translator when the voltage domain attribute of the pin and the voltage logic attribute of the pin are different. The netlist file can later be read to manufacture the electronic circuit to include the different voltages and level translators as a single circuit and in a single manufacturing step.

Figure 1:
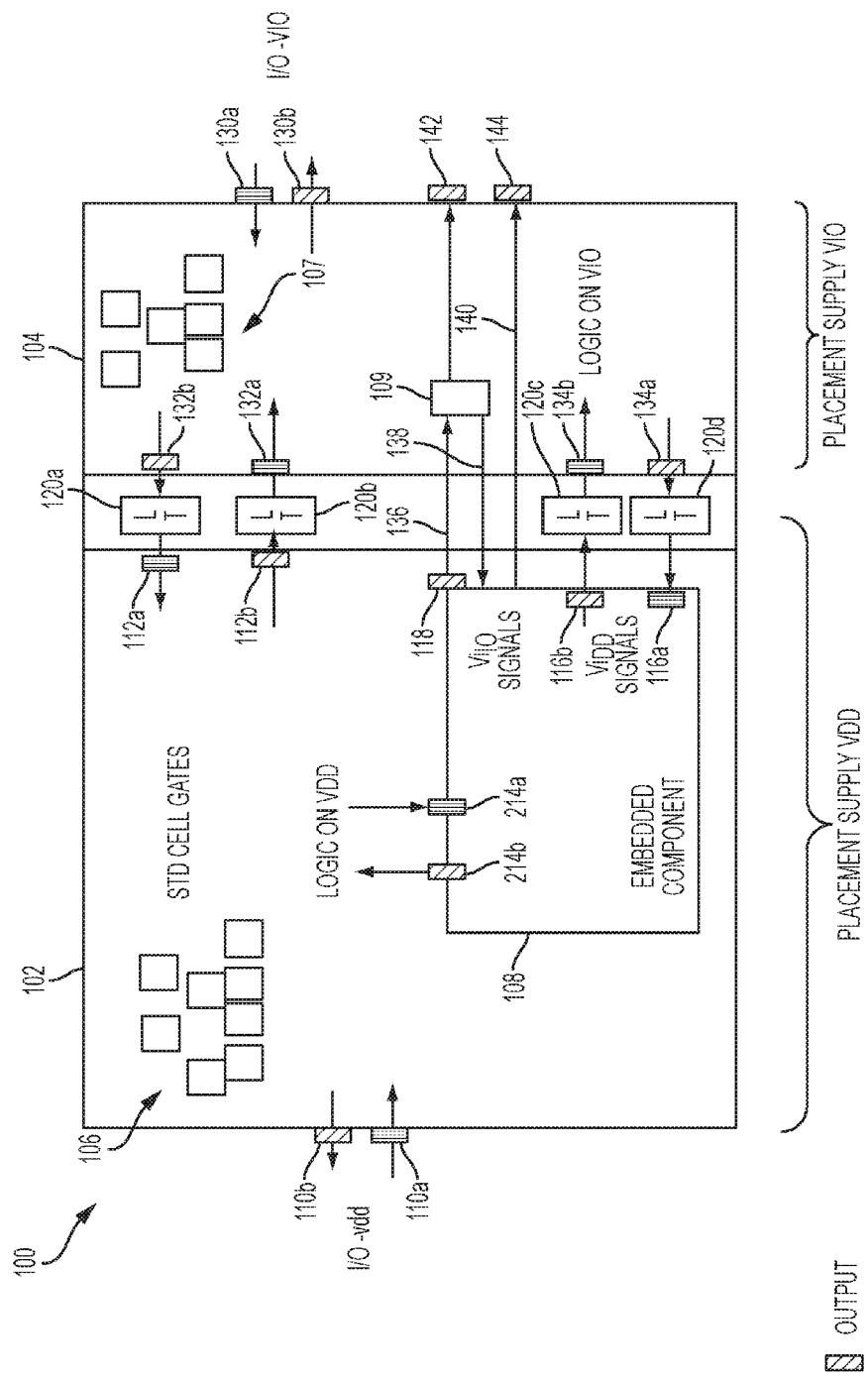
FIG. 1 shows a schematic diagram of a macro for an integrated electronic circuit that includes multiple voltage domains, according to one embodiment of the present invention.

FIG. 1 shows a schematic diagram of a macro 100 for an integrated electronic circuit that includes multiple voltage domains, according to one embodiment of the present invention. The macro 100 includes a first voltage domain 102 and a second voltage domain 104 along with level translators 120a-120d, that are formed as a single integrated electronic circuit 100 during a manufacturing step. Level translators convert a digital signal that is operating at one voltage to a digital signal at another voltage. For illustrative purposes, the first voltage domain 102 is operated on a power supply running at a first voltage (referred to herein as "$V_{DD}$") and the second voltage domain 104 is operated on a power supply running at a second voltage (referred to herein as "$V_{IO}$"). Although only two voltage domains are shown in the diagram of FIG. 1, it is to be understood that any number of voltage domains can be included in the macro. Additionally, other interface blocks between voltage domains besides the level translators can also be included in the macro 100 in other embodiments an example of which is the embedded component 108.

The first voltage domain 102 includes various standard cell gates 106, such as logical gates, NAND gates, etc. The first voltage domain 102 also includes input gates or input ports 110a, 112a and output gates or output ports 110b, 112b for sending and receiving signals, such as digital signals, into and out of the first voltage domain 102. Input gate 110a receives signals from an exterior circuit at voltage $V_{DD}$, while output gate 110b sends signal to the exterior circuit at voltage $V_{DD}$. Input gate 112a receives signals from the second voltage domain 104 at $V_{DD}$ while output gate 112b sends signals to the second voltage domain 104 at $V_{DD}$.

The second voltage domain 104 includes standard logic gates 107 as well as various input and output gates. Input gate 130a receives signals from an exterior domain or circuit, while output gate 130b sending signals to the exterior circuit. Input gate 132a receives signals from the first voltage domain 102 at $V_{IO}$ while output gate 132b sends signals to the first voltage domain 102 at $V_{IO}$. Output gate 132b is connected to input gate 112a of the first domain by a level translator 120a. The level translator 120a receives logical signals at $V_{IO}$ and outputs a logical signal at $V_{DD}$. Input gate 132a is connected to output gate 112b of the first domain 102 by level translator 120b. Level translator 120b receives logical signals at $V_{DD}$ and outputs a logical signal at $V_{IO}$. Thus, level translators 120a and 120b provide digital communication across the first domain 102 and the second domain 104.

Returning to the first voltage domain 102, the first voltage domain 102 further includes an embedded component 108 that is built separately from the first voltage domain, but which can be embedded physically within the first voltage domain 102 so as to function on the power supply $V_{DD}$ of the first voltage domain 102. Input gate 214a receives signals from the first voltage domain 102 and sends signals into the embedded component 108. Output gate 114b receives signals from the embedded component 108 and sends signals into the first voltage domain 102. While an embedded component is shown only within the first domain 102, and embedded component 108 can alternately or additionally be provided within the second domain 104.

The embedded component 108 may be capable of communicating with the second voltage domain 104 by transmitting signals either at $V_{IO}$ or $V_{DD}$. In one aspect, the embedded component 108 communicates signals at $V_{DD}$ and level translators 120c and 120d provide digital communication between the embedded component 108 of the first domain 102 and logical gates of the second domain 104. In particular, level translator 120c provides communication between output gate 116b of the embedded component 108 and the input gate 134b of the second domain 104. Level translator 120d provides communication between output gate 134a of the second domain 104 and input gate 116a of the embedded component 108. In another aspect, the embedded component 108 communication signals at $V_{IO}$. For the communication signals at $V_{IO}$ between the embedded component 108 and the second voltage domain 104, there is no need for level translators, since there is no change in voltage. Therefore, output gate 118 is shown communicating with cell gate 109 directly (i.e., without level translators) via arrow 136. The cell gate 109 can then relay the signal from embedded component 108 to an exterior circuit or domain via output gate 142. Arrow 138 indicates a signal being sent from cell gate 109 to the embedded component 108 without use of a level translator. Arrow 140 shows that a signal can be sent from the embedded component 108 to output from the second voltage domain 104 at output gate 144 without the use of level translators.

During a circuit design stage of the first voltage domain, a VHDL file for the first voltage domain 102 can be made that includes boundary pins on the first voltage domain 102 and their related pin attributes. Similarly, during the design stage of the second voltage domain 104, a VHDL file for the second voltage domain 104 can be made to include boundary pins on the second voltage domain 104 their related pin attributes. The VHDL files for the first voltage domain 102 and the second voltage domain 104 can be combined into a single VHDL file. During a synthesis stage, the combined VHDL file is read and an attribute table of pins is created with pin attributes. The pin attributes indicate the voltage domain of the pin and the logic voltage of the pin, among others.

Figure 2:
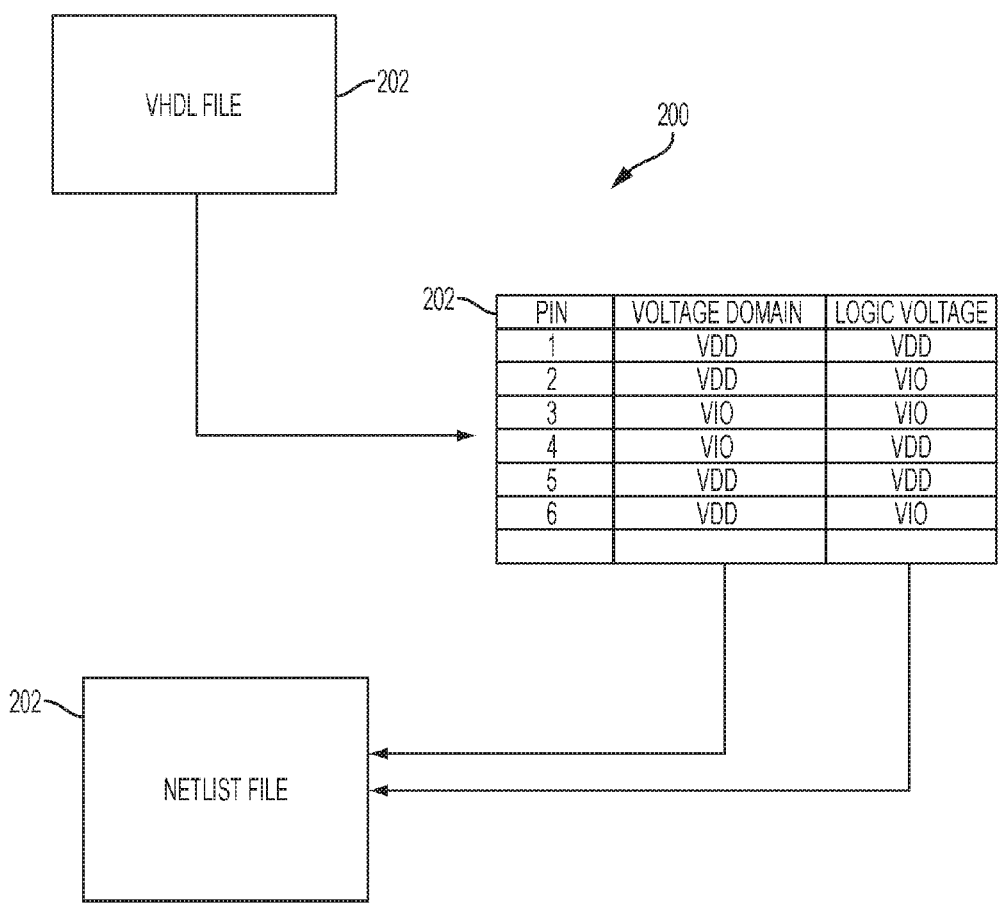
FIG. 2 illustrates schematically a synthesis process for manufacturing a circuit in accordance with one embodiment of the present invention.
Figure 3:
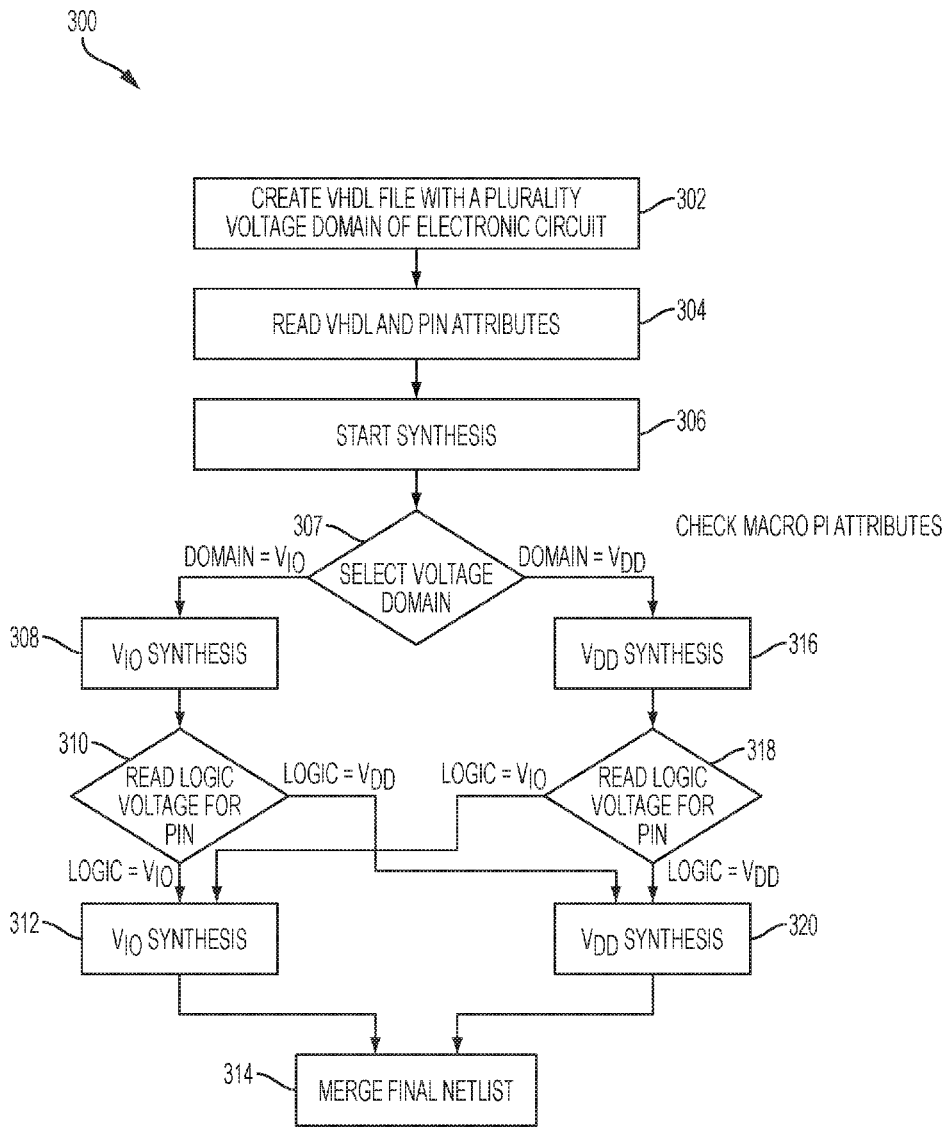
FIG. 3 shows a flowchart illustrating a method of manufacturing the exemplary macro of FIG. 1, according to an embodiment of the present invention.

FIG. 2 illustrates schematically a synthesis process 200 for manufacturing a circuit in accordance with one embodiment of the present invention. A processor reads the VHDL file 202 to create an attribute table 204 for the pins. The processor then refers to the attribute table 204 when creating netlist file 206. For example, when synthesizing netlist instructions for pin 1, a synthesis program begins syntheses for a pin in first voltage domain $V_{DD}$ and completes synthesis for the pin in first voltage domain $V_{DD}$. However, for pin 2, the synthesis program begins synthesis in first voltage domain $V_{DD}$ and completes synthesis for the pin in second voltage domain $V_{IO}$. Netlist instructions for pin 2 can include instruction for a level translator suitable for translating from $V_{DD}$ to FIG. 3 shows a flowchart 300 illustrating a method of manufacturing the exemplary macro of FIG. 1 according to an embodiment of the present invention. In box 302, a VHDL file is created for the first voltage domain 102 and second voltage domain 104 as well as another other voltage domains or embedded components. The VHDL files include logic for boundary pins of the domain. The VHDL files can be combined into a single VHDL file. In box 304, the VHDL file is read and an attribute table is created for the attributes of the boundary pins. In Box 306 a synthesis process for physical design of the circuit begins. In Box 307 a voltage domain attribute for a pin is read from the attribute table 204. Synthesis for the appropriate voltage domain is selected based on the voltage domain attribute for the pin. If the voltage domain attribute for the pin is $V_{IO}$, the method proceeds to the left side (i.e., box 308) of the flowchart 300. If the voltage domain attribute is $V_{DD}$, the method proceeds to the right side (i.e., box 316) of the flowchart 300. Proceeding to box 308, synthesis for logic associated with the pin is started for the selected voltage domain (i.e., voltage domain $V_{IO}$). In box 310, the logic voltage attribute for logically associated pins is read from the attribute table 204. In box 312, if the logic voltage is the same as the voltage domain, then the synthesis is completed in the first voltage domain. However, in box 310, if the logic voltage is different than the voltage domain, the synthesis is completed in the second voltage domain. The synthesis in box 320 can include netlist instructions for manufacturing a suitable level translator. The steps of the flowchart can be performed for each pin of the electronic circuit to create a final netlist. Alternatively, the information in box 307, may indicate the voltage domain for the pin is $V_{DD}$ in which case the process proceeds to box 316. In box 316, synthesis begins in the $V_{DD}$ domain. In box 318, all voltage attributes are read for logically associated pins from the attribute table 204. If the logic voltage attribute indicates that the pin logic is in the $V_{DD}$ domain, the synthesis is completed in the $V_{DD}$ domain (box 320) and the synthesized instructions are placed in the netlist (Box 314). Otherwise, at box 318, if the logic voltage attribute indicates that the pin logic is in the $V_{IO}$ domain, synthesis is completed in the $V_{IO}$ domain (box 312) and the synthesized instructions are placed in the netlist (box 314). The final netlist is a merged netlist from box 312 and box 320.

The final netlist therefore includes netlist instructions for level translators as well as netlist instructions for design of each of the voltage domains. Thus, at a later manufacturing stage, the first voltage domain, second voltage domain and level translators can be manufactured in a single manufacturing step. The number of components in the final product is thus reduced from at least three (e.g., first voltage domain, second voltage domain, and level translator) to one. In addition, the ability to design the level translator prior to manufacture of the first voltage domain and the second voltage domain allows for greater flexibility in the physical placement of the boundary pins of the first voltage domain and the second voltage domain. Additionally, a number of steps for manufacture of the circuit are reduced vs. manufacturing voltage domains separate and bridging them together at a later stage. FIG. 4 shows a pseudocode algorithm, illustrated in the flowchart of FIG. 3, for manufacturing a netlist for a macro in one embodiment of the present invention.

Figure 5:
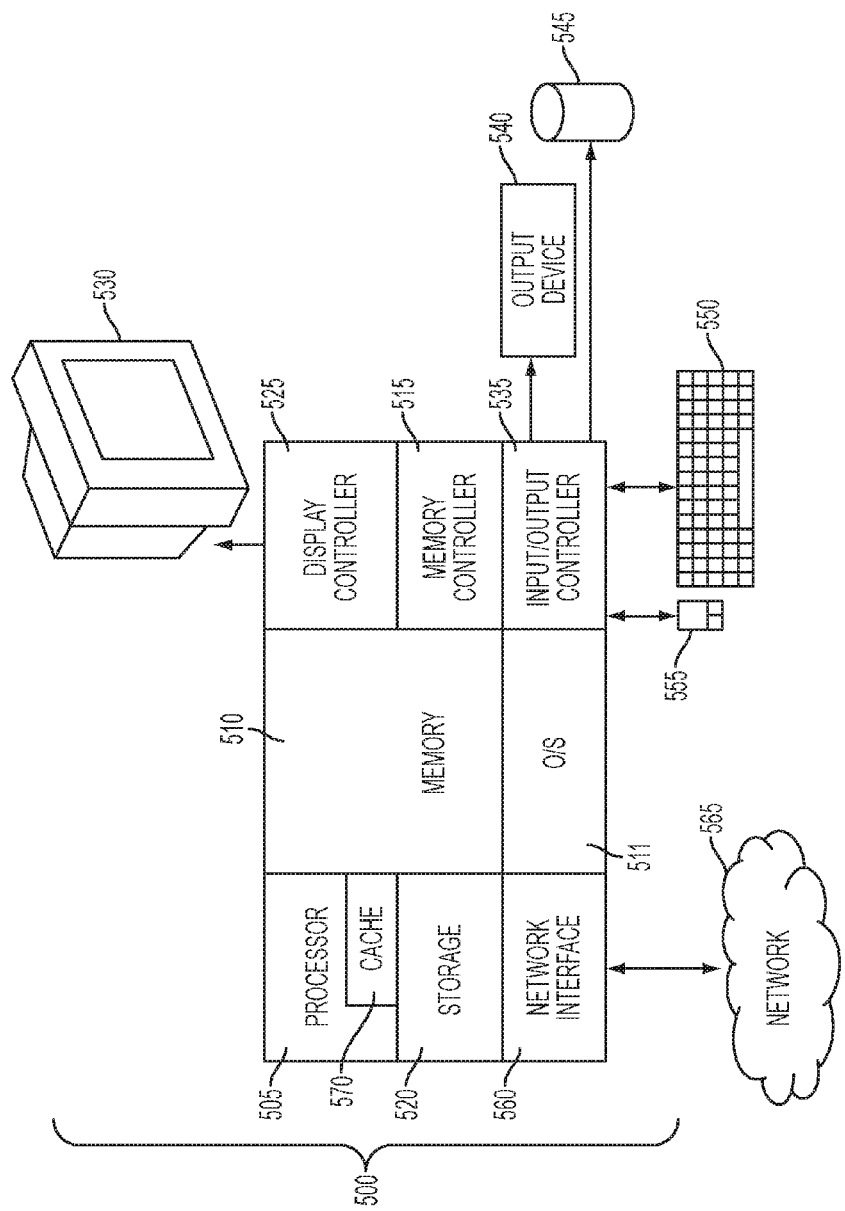
FIG. 5 illustrates a block diagram of a computer system for use in implementing a system or method according to some embodiments of the present invention.

FIG. 5 illustrates a block diagram of a computer system 500 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer.

In some embodiments, as shown in FIG. 5, the computer system 500 includes a processor 505, memory 510 coupled to a memory controller 515, and one or more input devices 545 and/or output devices 540, such as peripherals, that are communicatively coupled via a local I/O controller 535. These devices 540 and 545 may include, for example, a printer, a scanner, a microphone, and the like. Input devices such as a conventional keyboard 550 and mouse 555 may be coupled to the I/O controller 535. The I/O controller 535 may be, for example, one or more buses or other wired or wireless connections, as are known in the art. The I/O controller 535 may have additional elements, which are omitted for simplicity, such as controllers, buffers (caches), drivers, repeaters, and receivers, to enable communications.

The I/O devices 540, 545 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 505 is a hardware device for executing hardware instructions or software, particularly those stored in memory 510. The processor 505 may be a custom made or commercially available processor, a central processing unit (CPU), an auxiliary processor among several processors associated with the computer system 500, a semiconductor based microprocessor (in the form of a microchip or chip set), a macroprocessor, or other device for executing instructions. The processor 505 includes a cache 570, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 570 may be organized as a hierarchy of more cache levels (L1, L2, etc.).

The memory 510 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 610 may have a distributed architecture, where various components are situated remote from one another but may be accessed by the processor 405.

The instructions in memory 510 may include one or more separate programs, each of which comprises an ordered listing of executable instructions for implementing logical functions. In the example of FIG. 5, the instructions in the memory 510 include a suitable operating system (OS) 511. The operating system 511 essentially may control the execution of other computer programs and provides scheduling, input-output control, file and data management, memory management, and communication control and related services.

Additional data, including, for example, instructions for the processor 405 or other retrievable information, may be stored in storage 520, which may be a storage device such as a hard disk drive or solid state drive. The stored instructions in memory 510 or in storage 520 may include those enabling the processor to execute one or more aspects of the systems and methods of this disclosure.

The computer system 500 may further include a display controller 525 coupled to a display 530. In some embodiments, the computer system 500 may further include a network interface 560 for coupling to a network 565. The network 565 may be an IP-based network for communication between the computer system 500 and an external server, client and the like via a broadband connection. The network 565 transmits and receives data between the computer system 500 and external systems. In some embodiments, the network 565 may be a managed IP network administered by a service provider. The network 565 may be implemented in a wireless fashion, e.g., using wireless protocols and technologies, such as WiFi, WiMax, etc. The network 565 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in computer systems 500, such as that illustrated in FIG. 5.

Technical effects and benefits of some embodiments include reduction of the number of design components as well as allowing for correctly identifying components on each voltage supply so that the components are placed correctly within the voltage domains or to fit optimal space considerations. The synthesis process correctly identifies signals that pass through the level translators to connect to next logic gates. Since all level translators and their related logic are provided in the same macro, dependence on other designers is reduced, thereby improving productivity. Productivity is further improved by having a fewer number of macros to design. Identifying level translator requirements at an earlier design stage improved flexibility in the placement of each component.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming a netlist for an electronic circuit, comprising:
creating a Very High Speed Integrated Circuit Hardware Description Language (VHDL) file for a plurality of voltage domains, wherein the VHDL file includes a voltage domain attribute and a logic voltage attribute for a pin of the electronic circuit;
reading the voltage domain attribute and the logic voltage attribute for the pin from the VHDL file; and
synthesizing netlist instructions for the pin beginning with synthesizing netlist instructions within a voltage domain indicated by the voltage domain attribute and ending with synthesizing netlist instructions within a voltage domain indicated by the logic voltage attribute to form the netlist for the electronic circuit.

2. The method of claim 1, further comprising creating a pin attribute table from the VHDL file and reading the pin attribute table during synthesis of the pin.

3. The method of claim 1, further comprising completing a synthesis step for an interface block between a first of the plurality of voltage domains and a second of the plurality of voltage domains based on a voltage indicated by the voltage domain attribute being different than a voltage indicated by the logic voltage attribute.

4. The method of claim 3, wherein the interface block is a level translator.

5. The method of claim 3, wherein completing the synthesis step further comprises creating a netlist for implementation of the plurality of voltage domains and the interface block.

6. The method of claim 5, wherein synthesizing the netlist instructions for the pin enables manufacturing of the plurality of voltage domains and the interface block in a single manufacturing stage.

7. The method of claim 1, further comprising completing a synthesis step to include an interface block between the pin and one of the plurality of voltage domains, wherein the pin is included in an embedded component in one of the plurality of voltage domains.

8. A system for forming a netlist for an electronic circuit, the system comprising:
a memory having computer readable instructions; and
one or more processors for executing the computer readable instructions, the computer readable instructions causing the one or more processors to perform actions comprising:
creating a Very High Speed Integrated Circuit Hardware Description Language (VHDL) file for a plurality of voltage domains, wherein the VHDL file includes voltage domain attribute and a logic voltage attribute for a pin of the electronic circuit
reading the voltage domain attribute and the logic voltage attribute for the pin from the VHDL file; and
synthesizing netlist instructions for the pin beginning with synthesizing netlist instructions within a voltage domain indicated by the voltage domain attribute and ending with synthesizing netlist instructions within a voltage domain indicated by the logic voltage attribute to form the netlist for the electronic circuit.

9. The system of claim 8, wherein the computer readable instructions further cause the one or more processors to perform actions comprising creating a pin attribute table from the VHDL file and reading the pin attribute table during synthesis of the pin.

10. The system of claim 8, wherein the computer readable instructions further cause the one or more processors to perform an action comprising completing a synthesis step for an interface block between a first of the plurality of voltage domains and a second of the plurality of voltage domains based on a voltage indicated by the voltage domain attribute being different than a voltage indicated by the logic voltage attribute.

11. The system of claim 10, wherein the interface block is a level translator.

12. The system of 10, wherein completing the synthesis step further comprises creating a netlist for implementation of the plurality of voltage domains and the interface block.

13. The system of claim 12, wherein synthesizing the netlist instructions for the pin enables manufacturing the plurality of voltage domains and the interface block in a single manufacturing stage.

14. The system of claim 8, wherein the computer readable instructions further cause the one or more processors to perform an action comprising completing a synthesis step to include an interface block between the pin and one of the plurality of voltage domains, wherein the pin is included in an embedded component in one of the plurality of voltage domains.

15. A non-transitory computer program product for forming a netlist for an electronic circuit, the computer program product comprising a computer readable storage medium having program instructions embodied therewith, the program instructions executable by a processor to cause the processor to perform:
creating a Very High Speed Integrated Circuit Hardware Description Language (VHDL) file for a plurality of voltage domains, wherein the VHDL file includes voltage domain attribute and a logic voltage attribute for a pin of the electronic circuit
reading the voltage domain attribute and the logic voltage attribute for the pin from the VHDL file; and
synthesizing netlist instructions for the pin beginning with synthesizing netlist instructions within a voltage domain indicated by the voltage domain attribute and ending with synthesizing netlist instructions within a voltage domain indicated by the logic voltage attribute to form the netlist for the electronic circuit.

16. The system of claim 15, further comprising creating a pin attribute table from the VHDL file and reading the pin attribute table during synthesis of the pin.

17. The system of claim 15, further comprising completing a synthesis step for an interface block between a first of the plurality of voltage domains and a second of the plurality of voltage domains based on a voltage indicated by the voltage domain attribute being different than a voltage indicated by the logic voltage attribute.

18. The system of claim 17, wherein the interface block is a level translator.

19. The system of claim 17, wherein completing the synthesis step further comprises creating a netlist for implementation of the plurality of voltage domains and the interface block.

20. The system of claim 15, further comprising completing a synthesis step to include an interface block between the pin and one of the plurality of voltage domains, wherein at least one of the plurality of voltage domains includes an embedded component.

* * * * *